United States Patent [19]

Weyand et al.

[11] Patent Number: 5,300,137
[45] Date of Patent: Apr. 5, 1994

[54] METHOD FOR REMOVING MERCURY FROM CONTAMINATED SOILS AND INDUSTRIAL WASTES AND RELATED APPARATUS

[75] Inventors: Thomas E. Weyand, Beaver Falls; Casimir J. Koshinski, New Brighton, both of Pa.

[73] Assignee: Pittsburgh Mineral and Environmental Technology, Inc., New Brighton, Pa.

[21] Appl. No.: 947,811

[22] Filed: Sep. 18, 1992

[51] Int. Cl.$^5$ .............................................. C22B 43/00
[52] U.S. Cl. ..................................... 75/670; 266/148; 405/128; 588/234
[58] Field of Search ................ 266/148, 149, 165; 75/670; 423/DIG. 20; 405/128; 588/234, 235

[56] References Cited

U.S. PATENT DOCUMENTS

| | | | |
|---|---|---|---|
| 3,615,363 | 10/1971 | deOca | 266/148 |
| 3,785,942 | 1/1974 | Carlson | 204/99 |
| 3,836,442 | 9/1974 | Dean et al. | 204/99 |
| 4,012,297 | 3/1977 | Balko et al. | 204/99 |
| 4,087,276 | 5/1978 | Generini | 75/81 |
| 4,149,879 | 4/1979 | Loo | 75/97 |
| 4,354,942 | 10/1982 | Kaczur et al. | 210/712 |
| 4,468,011 | 8/1984 | Sikander et al. | 266/149 |
| 4,708,853 | 11/1987 | Matviya et al. | 423/210 |
| 4,844,815 | 7/1989 | Ader et al. | 210/751 |
| 4,853,208 | 8/1989 | Reimers et al. | 423/659 |
| 4,879,010 | 11/1989 | Grossman et al. | 204/105 |
| 4,921,538 | 5/1990 | Lafser et al. | 106/100 |
| 4,977,837 | 12/1990 | Roos et al. | 110/165 |
| 5,013,358 | 5/1991 | Ball et al. | 75/742 |
| 5,037,286 | 8/1991 | Roberts | 425/222 |
| 5,056,541 | 10/1991 | Schade | 210/772 |
| 5,121,699 | 6/1992 | Frank | 423/DIG. 20 |

OTHER PUBLICATIONS

"The Metallurgy of Quicksilver", Duschak, L. H. & Schuette, C. N., U.S. Bureau of Mines Bulletin 222, 1925, pp. 7–11.
"Mercury-History of Quicksilver", York Press, 1972 pp. 53–54, L. J. Goldwater.
"Quicksilver", Schuette, C. N., U.S. Bureau of Mines Bulletin 335, 1931 pp. 63–65.

Primary Examiner—Melvyn J. Andrews
Attorney, Agent, or Firm—Arnold B. Silverman

[57] ABSTRACT

A method and an apparatus for removing mercury from contaminated soils and industrial wastes are provided. The removed mercury may be recovered. A furnace vaporizes the mercury containing portion and the vapors are condensed. In one embodiment, an individual heating stage volatilizes water vapor and other volatile contaminants, such as hydrocarbons, with substantial vaporization of the mercury-containing portion, subsequently, a second temperature higher than the first is employed to vaporize the mercury containing portion. In one embodiment, a metallic salt reacts with sulfur in the material to form a stable solid sulfur compound to reduce sulfur content in the gaseous effluent. The addition of a metallic salt may also be employed to react with mercury halides to release elemental mercury therefrom. The contaminated material is thereby converted from one which is hazardous due to mercury contamination to one which is non-hazardous. The effluent is treated to reduce environmental hazards in the same. The system is preferably provided on or in a vehicle so as to facilitate treatment of the contaminated materials at the site of the same.

40 Claims, 4 Drawing Sheets

METHOD FOR REMOVING MERCURY FROM CONTAMINATED SOILS AND INDUSTRIAL WASTES AND RELATED APPARATUS

BACKGROUND OF INVENTION

1. Field of Invention

This invention relates to an improved method of removing mercury and mercury compounds from contaminated soils and industrial waste materials and an apparatus related thereto. More specifically, the invention relates to a system for (a) converting soils and industrial waste products that have been classified as "hazardous" because of their mercury content into materials classified as "non-hazardous" by removing the mercury and (b) recovering and recycling the removed mercury in a manner that minimizes environmental risk and undesired worker exposure.

2. Description of the Prior Art

The disposal of soils and industrial wastes contaminated with mercury or mercury compounds has created major environmental and economic problems for industry. The U.S. Environmental Protection Agency (the "EPA") has classified any industrial waste product having a leachable mercury content of 0.2 parts per million (ppm) or higher (as measured by the standard EPA TCLP Leach Test) as hazardous waste that must be disposed of in a secure hazardous waste land disposal facility. In addition, many state environmental regulatory agencies are requiring that soils contaminated with mercury must be treated to reduce the mercury content to levels equivalent to the background levels that existed in the soils prior to contamination before the that existed in the soils prior to contamination before the treated soils can be disposed of or used as a land fill material.

The relatively low mercury content and large volume of inert materials in contaminated soils and industrial wastes make economic recovery of the contained mercury difficult and the disposal of the contaminated waste extremely costly. As a result, there is a need for a method of removing mercury from soils and industrial wastes that (a) reduces the mercury content of said soils to at least the background level, (b) reduces the mercury content of said industrial wastes to 0.2 ppm or below, and (c) recovers the removed mercury in usable form thereby recovering some economic value and breaking the chain of liability inherent in disposal of mercury-containing wastes classified as hazardous by the EPA.

Mercury contamination of soil is especially acute in the area of metering station sites along natural gas pipelines where, for over 30 years, metallic mercury was routinely discharged onto the ground each time the mercury utilized in flow measuring devices was replaced or failure of said devices occurred. These contaminated sites are characterized by relatively low concentrations of mercury (100 to 2,000 ppm); substantial variations in soil constituents (such as clay minerals, iron/-manganese oxides and hydroxides, gypsum, jarosite, quartz, carbonates, organic and carbonaceous matter, and the like); and the presence of mercury in a wide variety of forms (such as metallic mercury, mercury oxides, mercury sulfides, methyl mercury, and the like). These site characteristics, individually and collectively, prevent efficient, complete and economical removal and recovery of the contained mercury and effective decontaminations of the treated soil. Efficient and economical decontamination of the such sites requires a mercury removal process that is capable of processing soils that very substantially in type and composition, and simultaneously removes the wide variety of forms and compositions of mercury that may exist in the soil. Such a system should reduce the mercury content of the treated soil to the background level of mercury (usually less than 1 ppm) normally present in that particular soil and permits recovery of the removed mercury in reusable form. The equipment should be sufficiently portable to be economically moved from site to site, thereby eliminating the need to transport large volumes of soil to a remote treatment facility in order to remove the mercury therefrom.

Similar problems are encountered when treating mercury-contaminated industrial and incinerator wastes which also vary greatly in mineral form and composition from site to site, contain relatively small amounts of mercury, and are located over a wide geographic area in quantities too small to permit economic recovery of the mercury contained therein.

The removal of mercury from ores and mineral-based materials by thermal means is well known in the art. The mercury contained in such ores and minerals is normally present in the form of metallic mercury that can be vaporized by heating the material to be treated at temperatures above the boiling point of mercury 357° C. (675° F.) or in the form of a crystalline mercuric sulfide (cinnabar) that must be heated to temperatures above 580° C. (1,076° F.) in order to release mercury vapor. See L. H. Duschak and C. N. Schuette, "The Metallurgy of Quicksilver", U.S. Bureau of Mines Bulletin 222, 1925, Pp, 7–11. Vaporization of mercury from such ores and minerals is normally accomplished by heating the ores and minerals in retort furnaces, shaft furnaces, rotary kilns, or multiple hearth furnaces from which the mercury vapor produced is passed into condensers in which it is condensed and collected in metallic form. See L. J. Goldwater, "Mercury—History of Quicksilver, York Press, 1972, Pp. 53–54.

Normally the mercury concentration in the ores or minerals from which mercury is to be extracted is relatively high compared to the mercury concentration in contaminated soils. The mercury concentration in such ores or minerals is usually further increased prior to thermal treatment by such means as crushing, screen, and/or floatation in order to improve the efficiency and economics of mercury removal and recovery and to minimize the amount of mercury vapor discharged from the apparatus. See C. N. Schuette, "Quicksilver", U.S. Bureau of Mines Bulletin 335, 1931, Pp. 63–65.

One known method for removing and recovering mercury from ores by thermal treatment of the ores and condensation of the mercury vapor resulting therefrom is disclosed in U.S. Pat. No. 3,615,363. It involves heating the mercury-containing ore in a non-transportable externally heated, hermetically sealed (relative to the heating source) chamber in which the mercury is vaporized and from which the mercury vapor is removed and transported into a cooled condenser by means of injecting a controllable flow of air into said chamber. The mercury vapor is condensed to form metallic mercury in the condenser by bringing the vapor into contact with the cool condenser walls and the surface of a cool pool of water located at the bottom of the condenser. The condensed mercury collects at the bottom of the water pool under the influence of gravity and is periodically removed therefrom. The gas from which the mercury vapor has been removed is discharged directly from the condenser without additional treatment. Although this and similar methods for removing mercury from ores by thermal means are capable of treating a wide variety of material compositions and recovering mercury from a variety of compounds as well as from metallic mercury contained in the ore, such methods (a) are normally designed to handle feed stocks containing relatively high concentrations of mercury, (b) normally require extensive preparation of the feed material prior to processing, (c) generate large volumes of dust, and (d) normally require large, bulky dust collection equipment to remove the dust from the gaseous effluent prior to discharge of the gases to the atmosphere. Accordingly, the equipment required to thermally treat large quantities of feed stock is normally large, non-transportable, and not generally suitable for removing small quantities of mercury from soils at widely scattered, remote geographic locations.

Methods for removing and recovering mercury from contaminated inorganic industrial wastes and industrial wastes containing organic matter by means of heating the wastes in a vacuum environment are disclosed in U.S. Pat. Nos. 4,087,276 and 4,468,011. U.S. Pat. No. 4,087,276 teaches the removal and recovery of organic industrial wastes containing mercury by heating a mercury-containing inorganic industrial waste material at a temperature of between 200° C. (392°) to 350° C. (662° F.) in a chamber maintained at a negative pressure ranging from 0.06 atmospheres to 0.1 atmospheres in order to vaporize the contained mercury. It also discloses recovering metallic mercury by condensing said mercury vapor in a condenser maintained at a temperature in the range of 20° C. (68° F.) to 50° C. (122° F.) and at a negative pressure approximately equal to that maintained in the chamber.

U.S. Pat. No. 4,468,011 discloses a method of separating mercury from mercury-contaminated battery waste containing plastic organic materials. It involves heating the contaminated waste in a chamber maintained at a negative pressure in order to vaporize the contained mercury, continuously introducing nitrogen gas into the chamber, passing the nitrogen-rich gas containing the generated mercury vapor and organic vapor that exits said chamber through an afterburner in which the organic vapor is completely decomposed and the hydrocarbons resulting from this decomposition are combusted to form $CO_2$ and water vapor. Subsequently, nitrogen gas containing the $CO_2$, water vapor, and mercury vapor is passed through successive condensers in which the mercury is condensed and recovered as metallic mercury. The need to maintain a relatively high vacuum and the use of large quantities of inert gas make both of these heretofore patented techniques uneconomical for the recovery of small amounts of mercury from large quantities of contaminated soil and dilute industrial wastes.

Other known means for recovering mercury and usable mercury compounds from mineral feed stocks and industrial wastes include chemical treatment, electrolysis of solutions containing mercury salts, and/or precipitation of mercury ions from mercury-bearing solutions.

U.S Pat. No. 5,013,358 discloses a chemical method for recovering relatively pure elemental mercury from feed stocks prepared from a mineral concentrate or solid inorganic industrial wastes containing small amounts of mercury. It involves preparing an aqueous slurry of the feed stock, solubilizing the mercury contained in the slurry by chlorination of the slurry, treating the chlorinated solution with iron to reduce and precipitate solids containing elemental mercury, and separating the mercury from the precipitated solids.

U.S. Pat. No. 4,879,010 describes electrochemical means for recovery of metallic mercury from $Hg_2Cl_2$ by means of dissolving the $Hg_2Cl_2$ in an aqueous electrolyte containing HCl. It also discloses recovery of mercury from HgO by dissolving the HgO in an aqueous electrolyte containing glacial acetic acid.

U.S Pat. No. 4,012,297 discloses a chemical process for recovering mercury from solid and liquid industrial wastes generated during the production of chlorine and caustic in mercury amalgam electrolytic cells. The process consists of treating the solid waste with sulfuric acid, solubilizing the waste with an oxidant, treating the resulting mercury-containing solution to form solid mercury sulfide, separating and solubilizing the mercury sulfide, and returning the dissolved mercury to the electrolysis cell for reuse.

Although these known chemical and electrochemical means of removing and recovering mercury from mineral concentrates and liquid and solid industrial wastes can be used to process feed stocks containing low concentrations of mercury, they are not well suited to processing contaminated soils due to the lack of portability of the required apparatus and the wide variation in the chemical and physical make-up of the soils and the mercury species contained therein which cause significant processing difficulties. These difficulties, which result primarily from the unwanted dissolution of non-targeted metals and minerals, include (a) needlessly consuming large amounts of valuable reagents, (b) altering the dissolution kinetics in an uncontrolled manner, (c) contamination of the mercury-containing end product, (d) the need to dispose of and/or treat of large quantities of contaminated liquids, and (e) the possibility of producing another contaminated solid waste for disposal or treatment.

Other known techniques for treating mercury-contaminated soils and industrial wastes prior to disposal involve converting the contained mercury to relatively insoluble species and encapsulating the insoluble species such that the leachable mercury contained in the treated soil or waste is less than the limit established by the EPA in defining "hazardous waste". Various methods of stabilizing and encapsulating mercury compounds in treated soils and industrial wastes are disclosed in U.S. Pat. Nos. 4,853,208, 4,844,815, 4,921,538, 4,977,837, and 5,037,286.

U.S. Pat. No. 4,853,208 discloses a method of physically and chemically encapsulating mercury species contained in mercury-containing industrial wastes by treating the wastes with an additive (i.e., mercaptan), an alkali metal silicate, and a setting agent such as cement such that, upon setting, the treated waste is rendered non-polluting.

U.S. Pat. No. 4,844,815 discloses a method of reducing the leachability of mercury contained in industrial wastes that involves mixing the waste with elemental sulfur, a strong caustic, and cement kiln dust and allowing the mixture to cure prior to disposal.

U.S. Pat. No. 4,921,538 discloses a method for recycling mercury-containing soils and industrial wastes that comprises combining the soil or industrial waste with a mixture of inorganic materials such as calcium oxide, silica, aluminum oxide, iron oxide, and magnesium oxide in proportions that result in a final mixture having a composition suitable for the production of Portland Cement, preparing a slurry of said final mixture, and heating the slurry in a cement kiln to a temperature sufficient to form a cement clinker that passes the standard EPA TCLP Leach Test pertaining to mercury leachability.

U.S. Pat. No. 4,354,942 discloses a method of preventing the leaching of soluble mercury species from deposits of mercury-containing materials by stabilizing the soluble mercury species by treating the deposits in situ with an inorganic sulfur compound such as a metallic sulfate or thiosulfate.

U.S. Pat. No. 4,977,837 discloses a process and apparatus for reducing the leachability of mercury contained in incinerator ash by mixing the ash with a glass material and fusing the mixture such that the fly ash becomes vitrified by combining with the glass. Another method for limiting the leachability of mercury contained in incinerator wastes, disclosed in U.S. Pat. No. 5,037,286, is based upon mixing the wastes with Portland Cement, aggregating the mixture into balls, and creating a cement coating on the surface of said balls.

Although the aforesaid prior art methods and techniques of stabilizing and encapsulating mercury species contained in soils and industrial wastes are capable of significantly reducing the leachability of mercury from said soils and wastes, they greatly increase the volume of material requiring disposal and do not reduce the mercury content of the treated product, thereby extending the chain of environmental liability inherent in the disposal or re-use of the treated material.

None of the heretofore discussed prior art treatment methods or apparatus are adaptable to the economical, on-site reduction of the leachable mercury content in mercury-contaminated soils and industrial wastes, conversion of materials classified as "hazardous waste" to materials classified as "non-hazardous waste", and recovery of the removed mercury in usable form thereby ending the environmental liability related to the treated soil or waste.

There remains, therefore, a need for a practical method of (a) economically removing mercury from contaminated soils and industrial wastes that vary greatly in composition, physical form, and the species of mercury contained therein; (b) on-site conversion of mercury-containing soils and industrial wastes classified as "hazardous" to conversion products classified as "non-hazardous" by removal of the mercury therefrom; (c) recovering the removed mercury in usable form; and (d) thermally treating mercury-bearing soils and industrial wastes in a manner that permits control of the mercury, sulfur, and dust contents in the gaseous process effluent to a degree that the effluent is considered harmless to the environment and to persons practicing the method. Such a system incorporating these improvements would substantially reduce the cost of treating mercury contaminated soils and wastes and greatly reduce the environmental dangers inherent therein.

SUMMARY OF INVENTION

The present invention has met the hereinabove described needs. The invention provides a method of removing mercury and mercury compounds from mercury-contaminated materials such as soils and hazardous industrial wastes (including incinerator waste). It also facilitates recovering the removed mercury and mercury compounds in reusable form. Mercury removal is preferably achieved by heating the contaminated material to a temperature at which the mercury-containing portion is vaporized with the vapors being subsequently condensed in a form suitable for reuse or further refinement. During the treatment cycle, the contaminated material is preferably heated to, and maintained at, at least two different temperatures that include an initial temperature at which water vapor and other volatile contaminants are removed from the contaminated material without vaporizing a significant quantity of the mercury-containing portion and a second temperature at which the mercury-containing portion is vaporized and transported by means of a controlled air stream to a cooling device in which the vaporized mercury-containing portion is condensed.

The present invention preferably incorporates means for purifying the effluent air stream after the mercury portion has been condensed by removing residual mercury, mercury compounds, and other undesirable gaseous and solid impurities from the air effluent prior to discharge to the atmosphere.

In another embodiment of the invention, a calciferous material or other metallic salt capable of reacting with sulfur to form a stable solid sulfur compound or capable of releasing elemental mercury from mercury halides is added to the contaminated material prior to treatment in order to reduce the amount of gaseous sulfur compounds present in the air effluent or increase the recovery of elemental mercury.

It is an object of the current invention to provide a method and apparatus for removing mercury and mercury compounds from contaminated soils and industrial wastes.

It is another object of this invention to provide such a system that reduces the mercury content of contaminated soils to a level no greater than the background level of mercury contained in the soil prior to contamination.

It is a further object of this invention to reduce the leachable mercury content of mercury-bearing industrial wastes to a level less than about 0.2 ppm as measured by the standard EPA TCLP Leach Test.

It is a further object of this invention to minimize the content of gaseous sulfur compounds generated during the thermal treatment of mercury-contaminated soils and industrial wastes.

It is a further object of this invention to maximize the amount of elemental mercury recovered during the thermal treatment of mercury-contaminated soils and industrial wastes.

It is a further object of this invention to provide a transportable means of thermally treating contaminated soils and industrial wastes such that said means may be economically and efficiently transported to various sites at which said contaminated soils and industrial wastes are located.

It is a further object of this invention to remove and recover volatile hydrocarbon components from mercury-contaminated soil and industrial waste.

It is a further object of this invention to minimize the content of gaseous and particulate contaminants in the gaseous effluent resulting from the practice of the invention.

These and other objects of the invention will be more fully understood from the following detailed description of the invention and reference to the illustrations appended hereto.

DESCRIPTION OF PREFERRED EMBODIMENTS

Figure 1:
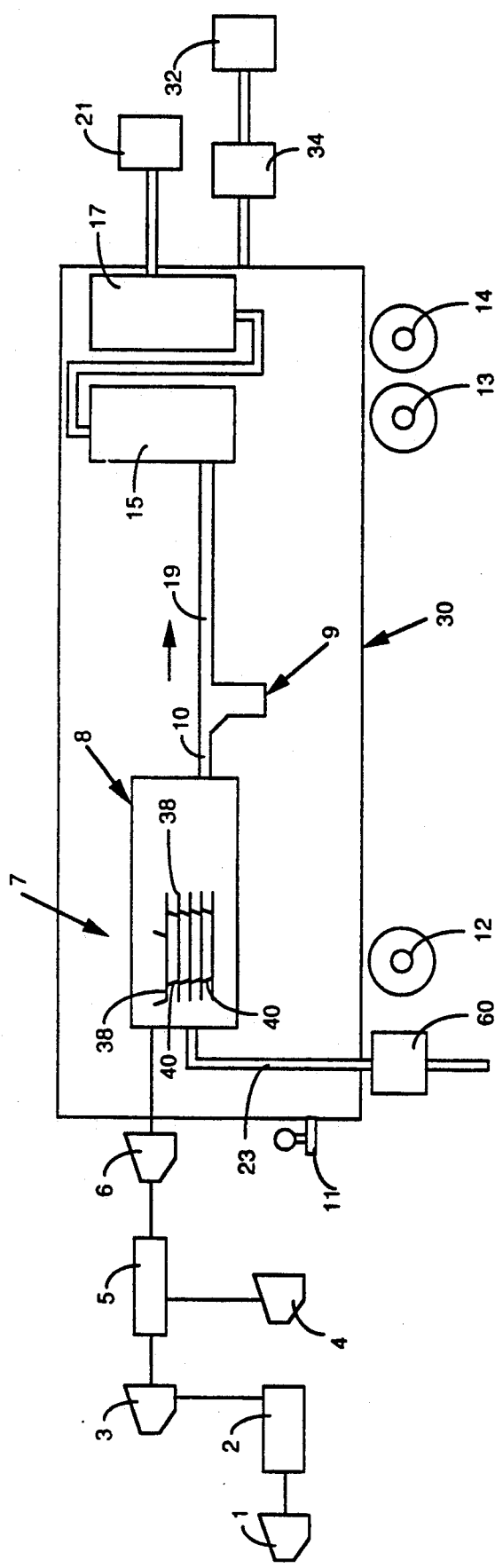
FIG. 1 is a partially schematic front elevational view of a system employed in practicing the present invention.

As employed herein, the expression "contaminated material" refers to mercury-contaminated soils, industrial waste, and other materials containing mercury-bearing substances in amounts sufficient to classify such soils, waste and other materials as "hazardous waste" in accordance with guidelines provided by the U.S. Environmental Protection Agency existing as of Sep. 14, 1992.

As employed herein, the expression "decontaminated material" will refer to contaminated material that has been treated to reduce the amount of mercury contained therein to a level at which the treated material may be classified as a "non-hazardous waste" in accordance with guidelines provided by the U.S. Environmental Protection Agency existing as of Sep. 14, 1992.

As employed herein, the expression "mercury portion" will refer to metallic mercury, compounds of mercury, and mercury-bearing substances of any type contained in "contaminated material."

As employed herein, the expression "essentially atmospheric pressure" will refer to pressures ranging from a slight subatmospheric pressure of about 0.5 atmosphere to a superatmospheric pressure of about 1.5 atmospheres.

The present invention provides an economical environmentally safe method of removing mercury from contaminated materials that vary greatly in composition and form and in the amount and species of mercury contained therein which preferably includes the steps of:

(a) comminuting the contaminated material to reduce the size and increase the surface area of agglomerates contained therein;

(b) combining the contaminated material with an additive that facilitates the decomposition of mercury compounds contained in the contaminated material and the release of elemental mercury during processing;

(c) combining the contaminated material with an additive that causes sulfurous materials contained in the contaminated material to form stable non-volatile sulfurous compounds during thermal treatment of the contaminated material/additive mixture;

(d) heating the contaminated material/additive mixture in an air environment maintained at essentially atmospheric pressure in two stages including:

(i) initially drying the contaminated material/additive mixture at a temperature sufficient to vaporize the moisture contained therein without vaporizing the mercury portion thereof; and (ii) subsequently increasing the temperature of the dried contaminated material/additive mixture sufficiently to vaporize the mercury portion thereof;

(e) condensing the vaporized mercury portion to obtain metallic mercury or mercury compounds in a form that can be reused with, or without, subsequent refining;

(f) cooling the solid decontaminated material residue resulting from the above described heating process; and (g) reusing or disposing of said decontaminated material.

In its broader aspects, the invention includes steps (d) and (e) with the use of the other steps being preferred. In some instances, the same additive can function in both steps (b) and (c).

FIG. 1 illustrates a system of the present invention for removing mercury from contaminated material and recovering the mercury in reusable form.

As shown in FIG. 1, the contaminated material to be treated 1 is preferably comminuted in a comminution apparatus 2 in which the size of certain of the agglomerates in said contaminated material is reduced. The surface area of the re-sized agglomerates is thereby increased, and the physical characteristics of the comminuted mass become more uniform. Comminution apparatus 2 may be a shredder, a crusher, a grinding device, or any other device capable of accomplishing the aforesaid results. Such apparatus is known to those skilled in the art. It is preferred that the comminution apparatus 2 be a shredder such as Model #5232 marketed by Saturn Shredder Division of MAC Corporation.

The comminuted contaminated material 3 may next be blended with an additive 4 in a suitable blender 5 to form a contaminated material/additive mixture 6. The additive may consist of a metallic compound that (a) facilitates decomposition of mercury halide compounds contained in the contaminated material to form a thermally stable, non-volatile metal halide and elemental mercury or a thermally decomposable mercury compound that readily releases elemental mercury during subsequent thermal processing, and/or (b) reacts with sulfurous substances contained in the contaminated material to form stable, non-volatile sulfurous compounds. The stabilization of the sulfur content of said sulfurous substances drastically reduces the sulfur dioxide content of the effluent gases generated during subsequent thermal treatment of the contaminated material/additive mixture 6.

The blender 5 may be a ribbon blender, a screw-type mixer, a cone-type blender, a tumbling device, or any other type of blender producing a relatively homogeneous mixture of the comminuted contaminated material 3 and additive 4 without significantly altering the physical characteristics of the comminuted contaminated material. It is preferred that the blender 5 be a ribbon blender of a type similar to Model #2900 produced by the Harley Manufacturing Company.

In a preferred embodiment of the invention, a calciferous material, such as calcium oxide (lime) may be used as the additive. Calcium oxide reacts with both mercury halide compounds and the sulfurous substances present in the contaminated material to achieve the aforesaid goals of decomposing the halide and stabilizing the sulfur, as illustrated in the following equations:

$$CaO + HgSO_4 \rightarrow CaSO_4 + Hg$$

Those skilled in the art will appreciate the fact that the quantities of the calciferous material employed will be the amount required to react chemically with the sulfurous substances and halides believed to be present in the contaminated material. Preferably, a slight excess of the additive is employed to enhance the efficiency of the reaction.

It will be known to those skilled in the art that other calciferous materials such as limestone, hydrated lime, lime, or cement kiln dust, for example, and other metallic compounds such as oxides of sodium, potassium, and magnesium, for example, and any other materials that react with mercury halides or sulfur in a manner similar to that described herein may be substituted for, or used in conjunction with, calcium oxide in practicing the current invention.

The contaminated material/additive mixture 6 is thermally treated in a mercury removal/recovery system which will be identified generally by reference number "7" and will include the furnace, condenser and gas cleaning columns, as well as the connecting ducts and associated air introduction and discharge means in which the mercury portion is removed from said mixture. The removed mercury is preferably recovered in usable form, and the mercury content of the treated material residue is lowered to the point that said treated material residue becomes decontaminated material.

The removal/recovery system in the form shown is preferably mounted on or in a vehicle which is a closed trailer having hitch 11 and three axles 12, 13, 14 each of which have at least one pair of tires secured thereto. In the alternative, the equipment may be housed in a self-propelled vehicle such as a truck or van or disposed on a flat bed trailer.

In this manner, the system may readily be moved from site to site. The mercury removal/recovery system 7 has a furnace 8 into which the contaminated material/additive mixture 6 is introduced in a batch manner through a suitable access door. The mixture 6 is subjected to a carefully controlled heating cycle during which the mixture is first dried and, after drying, the contained mercury and mercury compounds are vaporized. A condenser 9 is connected with the furnace 8 by duct 10. The vaporized mercury and mercury compounds are cooled and condensed in condenser 9. Two gas cleaning columns 15 and 17 receive effluent from condenser 9 by duct 19 in which any residual mercury-bearing substances and other volatile impurities are removed from the effluent gas stream prior of discharge of the gas stream to the atmosphere. Atmospheric air is introduced into furnace 8 through auxiliary gas cleaning column 60 and pipe 23 to achieve the desired mass transfer in said system and exhaust the process gas stream effluent to the atmosphere. Air exhaust means 21 is operated such that the desired mass flow is achieved while maintaining essentially atmospheric pressure in the mercury removal/recovery system 7. The purpose of auxiliary gas cleaning column 60 is to purify any gaseous effluent that might escape from mercury removal/recovery system 7 in the event that a large positive pressure accidently occurs in said system.

The mercury removal/recovery system 7 is enclosed within a containment chamber 30 that is maintained under a negative pressure by an air exhaust means 32 whenever contaminated material/additive mixture 6 is being heated in furnace 8. The air exhausted from containment chamber 30 is preferably passed through a filter means 34 to remove any harmful impurities that it might contain before the exhaust air is discharged into the atmosphere through air exhaust means 32.

The thermal treatment applied to contaminated material/additive mixture 6 in treatment furnace 8 preferably consists of three stages. During the first stage, the mixture 6 is heated at a temperature sufficient to vaporize the water and other volatile impurities contained in the mixture without vaporizing significant quantities of the mercury portion of said mixture. The furnace 8 is maintained at such temperature for a period of time sufficient to remove the major portion of said water and volatile impurities. During this stage, air drawn into furnace 8 through inlet pipe 23 carries the water vapor and other volatile contaminants released from said mixture through the system and exhausts the water vapor and volatile contaminants to the atmosphere through air exhaust means 21. During this first stage, condenser 9 is maintained at a temperature sufficiently high to avoid removing the water vapor from the air stream so that the vapor may be completely evacuated from the system prior to vaporizing the mercury from the contaminated material/additive mixture 6. In a preferred embodiment of the invention, the mixture is heated to and maintained at a temperature between about 16° C. (60° F.) and 260° C. (500° F.) for a period of about 30 minutes to four hours during this first stage. In a more preferred embodiment of the invention, the mixture is heated to and maintained at a temperature of at least about 204° C. (400° F.) for a period of at least about two hours.

During the second stage of the mercury removal/recovery process, the temperature of the treatment furnace 8 is controlled such that contaminated material/additive mixture 6 is heated to and maintained at a temperature in the range of about 316° C. (600° F.) to 816° C. (1,500° F.), and preferably between about 538° C. (1,000° F.) to 593° C. (1,100° F.), for a period of about between 30 minutes and 8 hours, and preferably between about 2 hours and 6 hours, in order to vaporize the mercury portion of said mixture. The vaporized mercury portion is transported into the condenser 9 by the air stream generated by air exhaust means 21. During this second stage, the temperature in the condenser 9 is maintained in the range of about 4° C. (40° F.) to 260° C. (500° F.) and preferably in the range of about 4° C. (40° F.) to 38° C. (100° F.) in order to condense substantially all of the vaporized mercury portion in the form of elemental mercury or mercury compounds. The air stream exiting condenser 9 is passed through gas cleaning columns 15 and 17 which remove residual traces of mercury from said air stream before the air stream is exhausted to the atmosphere through air exhaust means 21.

During the third stage of the mercury removal/recovery process, the heating of furnace 8 is halted and the temperature of the treated material from which substantially all of the mercury has been removed, (the "decontaminated material") is allowed to return to ambient levels. During this cooling period, the volume of air flowing through the system is maintained by air exhaust means 21 and the temperature in condenser 9 is maintained in the range utilized during stage 2 to assure removal from the gas stream of any mercury vapors generated during this final cool-down stage.

During the three-stage mercury removal/recovery process, the mercury removal/recovery system 7 is maintained at essentially atmospheric pressure by controlling the volume of air caused to flow through said system by air exhaust means 21. In a preferred embodiment of the invention, a slight subatmospheric pressure in the range of 0.995 atmosphere to 0.95 atmosphere is maintained in mercury removal/recovery system.

Throughout the entire three-stage mercury removal/recovery process, a negative pressure is maintained inside of the containment chamber 30 and air is preferably continuously drawn from the containment chamber 30 through filter means 34 by containment chamber air exhaust means 32 in order to exhaust and purify any contaminated air that might leak from the mercury removal/recovery system 7 into the containment chamber 30.

At the end of the third stage of the treatment process when the temperature in treatment furnace 8 approximates ambient temperature, the decontaminated material is removed from said treatment furnace on trays 40 for disposal or reuse and the condensed mercury product is removed from the condenser 9. If the decontaminated material is a soil, it may be returned to its original location without further concern about environmental liability due to the contained mercury content. If the decontaminated material is a treated industrial waste or incinerator ash, it may be reused or disposed of as a non-hazardous waste. The mercury product removed from the condenser 9 may be re-used without treatment or may be refined prior to re-use.

Thermal treatment of the contaminated material in furnaces may be achieved in any commonly used batch-type furnace including, but not limited to, a box furnace, a retort, or any similar furnace of enclosed design, or the contaminated material may be treated in a commercially available continuous-type furnace such as a rotary kiln, a shaft furnace or any similar continuous furnace in which the carefully controlled temperature conditions required to practice the invention can be maintained.

In a preferred embodiment of the invention, the contaminated material is thermally treated in an indirectly heated batch-type furnace containing multiple shelves 38 upon which a plurality of trays 40 containing the contaminated material are placed. The trays 40 are configured to maximize the ratio of the surface area of the contaminated material to the depth of said material in each tray. Apart from an access door (not shown) for introducing trays into the furnace and removing the same, the furnace 8 is sealed except for furnace air inlet tube 23 and furnace air outlet tube 10 through which the process air is drawn by air exhaust means 21. It is most preferred that the furnace 8 be of a size that can be installed inside of or on a mobile truck trailer or other suitable vehicle.

It is preferred that the condenser 9 be of an indirect type well known in the art and that the condenser structure be cooled by means of water or air flowing over the outer surface of said condenser, although any means of achieving the desired degree of cooling may be used. It is most preferred that the condenser 9 be of a size that can be mounted inside of a mobile truck trailer or other suitable vehicle or portable device.

Gas cleaning means 15 and 17 and auxiliary gas cleaning means 60 may, for example, consist of activated carbon columns, hepafilters, scrubbers, or any other device capable of removing residual vapors and submicron particles from the effluent gas stream. It is preferred that gas cleaning means 15 and 17 and auxiliary gas cleaning means 60 be based upon activated carbon columns or hepafilters or combinations thereof. It is most preferred that the gas cleaning means 15 and 17 be capable of absorbing mercury-containing vapors and filtering submicron particles from the gas effluent and that said gas cleaning means consist of at least two columns of Calgon Type HGR activated carbon configured to achieve a total carbon bed depth of at least one meter and that said gas cleaning means be of a size that can be contained inside of a mobile truck trailer or other suitable vehicle.

The containment chamber 30 may be configured to be stationary or transportable. In a preferred embodiment of this invention, the containment chamber 30 is mounted upon a wheeled structure such as a flat bed truck trailer that can easily transport the containment chamber 30 and the mercury removal/recovery system 7 contained therein between separated sites containing contaminated material. It is most preferred that the containment chamber 30 consist of an enclosed truck trailer of a type normally used in commerce. While for clarity of illustration, certain portions of the apparatus have been shown generally as being disposed outside of the containment chamber 30, these may be positioned as desired for proper functioning of the system.

Air exhaust means 21 and 32 may be any type of commercially available exhaust fan or other air moving device capable of exhausting the volume of air required in performing the invention.

Air cleaning means 60 may consist of a commercially available hepafilter or any other filtration device capable of removing mercury vapor and submicron particles from the air stream being processed.

Suitable sources of energy from means readily known to those skilled in the art will be provided to operate the system.

The solid purified material may conveniently be removed from furnace 8 on trays 38.

Figure 2:
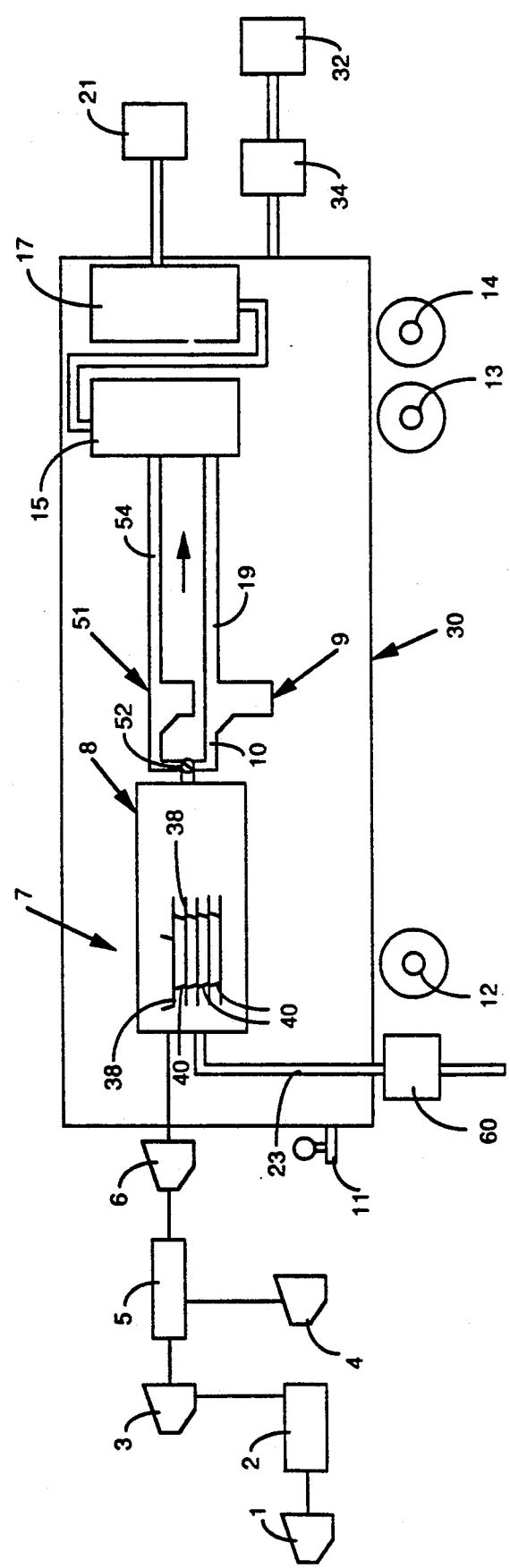
FIG. 2 is a partially schematic front elevational illustration of a modified form of the system illustrated in FIG. 1 employed in practicing the invention when the contaminated material contains volatile hydrocarbon impurities.

In a second embodiment of the invention, illustrated in FIG. 2, in which mercury is removed and recovered from contaminated materials containing a volatile hydrocarbon component, an auxiliary condenser 51 is added to mercury removal/recovery system 7. Auxiliary condenser 51 is positioned in the system such that the air stream containing water vapor and vaporized volatile impurities, such as the hydrocarbons, may be alternatively directed by switching valve 52 to pass through the heretofore described mercury condenser 9 or the auxiliary condenser 51 prior to passage through the gas cleaning columns 15 and 17.

In this second embodiment, mercury -contaminated material containing a volatile hydrocarbon component is first heated at a temperature sufficient to vaporize the contained water and the volatile hydrocarbon component without vaporizing significant quantities of the mercury portion of said contaminated material for a period of time sufficient to remove the major portion of said water and said volatile hydrocarbon component. During this stage, valve 52 is positioned such that air drawn into furnace 8 through inlet pipe 23 carries the water vapor and volatile hydrocarbon component through auxiliary condenser 51 which is maintained at a temperature at which the hydrocarbon vapor is condensed from said air stream while the water contained in said air stream remains as a vapor and passes through the condenser 51 without being condensed. The air stream containing the residual water vapor then passes through duct 54 to the gas cleaning columns 15 and 17 prior to being exhausted to the atmosphere through exhaust 21, as previously described.

The differential separation of the water vapor and volatile hydrocarbon component in the air stream can best be achieved by maintaining auxiliary condenser 51 at a temperature in the range of 110° C. (230° F.) to 350° C. (662° F.) and, preferably in the range of 110° C. (230° F.) and 191° C. (376° F.).

Upon removal of the desired amount of water and volatile hydrocarbon component from the mercury-contaminated material being treated, the temperature of said mercury-contaminated material in the furnace 8 is increased sufficiently to remove the contained mercury portion therefrom, as previously described.

The mercury-contaminated material containing a volatile hydrocarbon component may be treated in the as-received condition or may be comminuted or may be blended with additives that increase the efficiency of mercury removal or which reduce the quantity of sulfurous emissions in the gaseous effluent, or both, as previously described.

Figure 3:
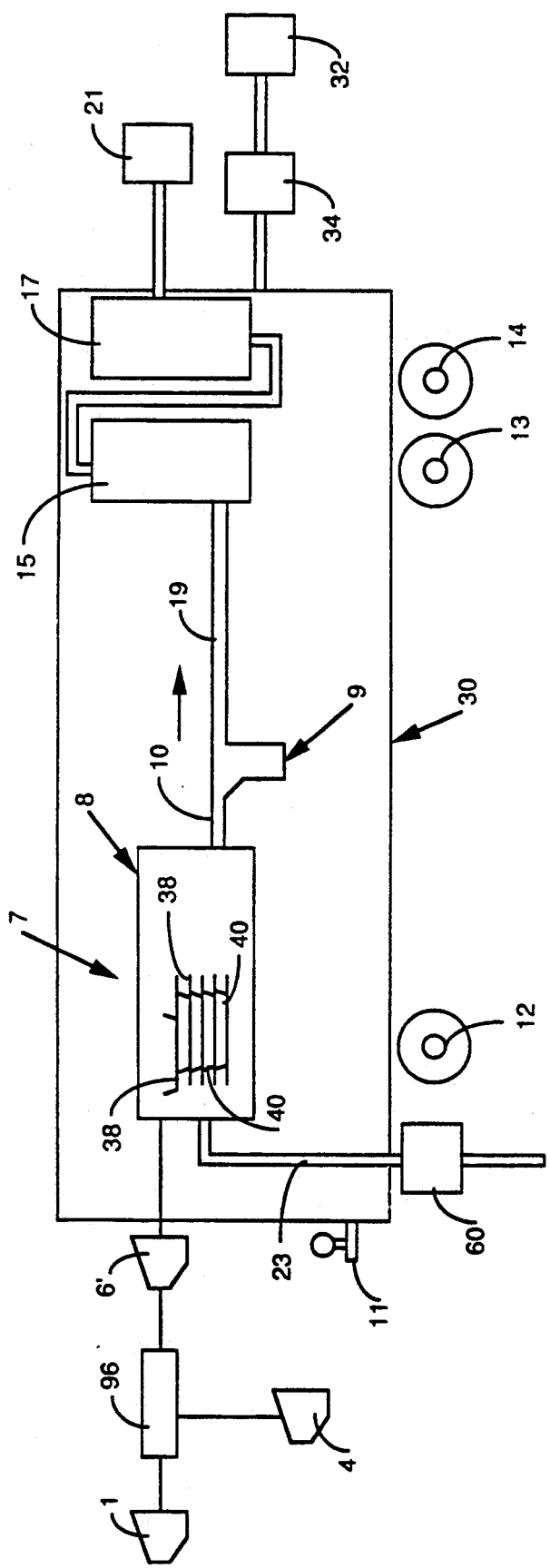
FIG. 3 is a partially schematic front elevational view of a second embodiment of the system employed in practicing the invention.

In a third embodiment of this invention, illustrated in FIG. 3, the additive 4 is fed directly into the comminution device 96 where it is blended with the contaminated material 1 as the contaminated material 1 is being comminuted. The blended contaminated material/additive mixture 6' may then be fed directly to the treatment furnace 8 without additional blending.

Figure 4:
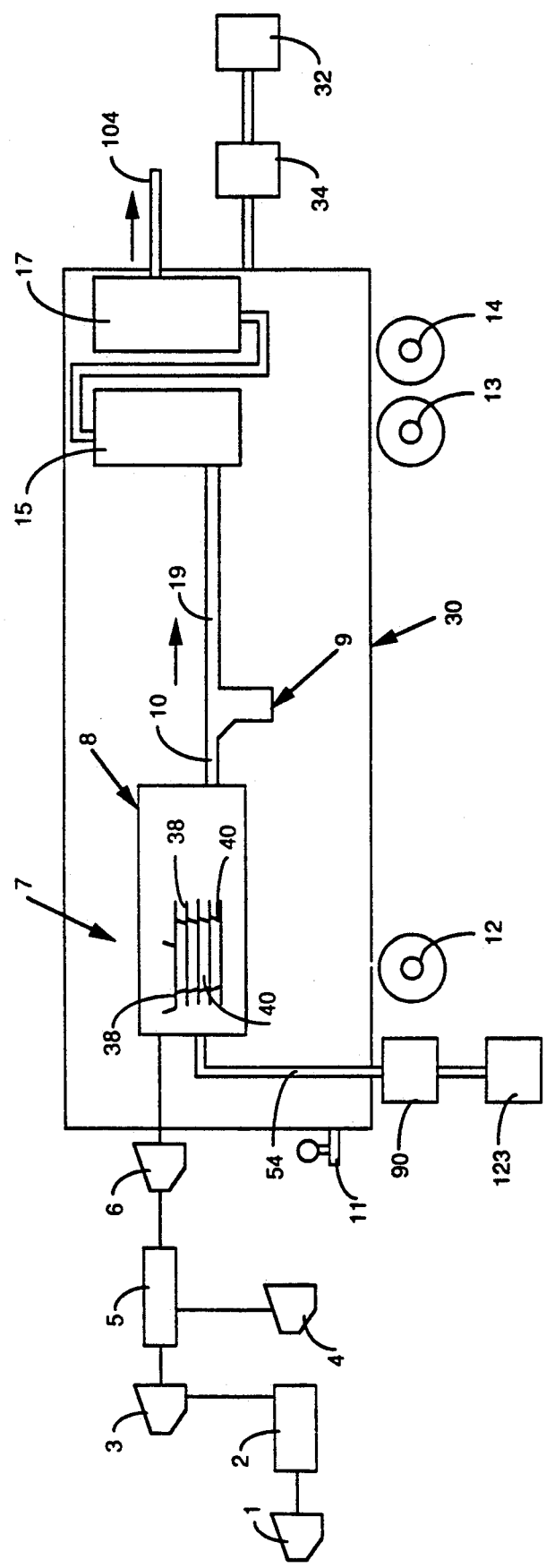
FIG. 4 is a partially schematic front elevational view of yet another alternative system employed in practicing the invention.

In a fourth embodiment of this invention, illustrated in FIG. 4, the air flow through the mercury removal/recovery system 7 is maintained at essentially atmospheric pressure by means of an air blowing means 123 which pushes air into said mercury removal/recovery system 7 through auxiliary gas cleaning means 90 and duct 54 such that a slight superatmospheric pressure of less than 1.5 atmospheres is maintained therewithin. In this embodiment, the furnace 8 has a plurality of shelves 38 supporting trays 40 which contain the material being treated. Treated effluent gas emerges from the system through vent 104.

The following examples provide specific preferred practices in employing the system of this invention.

EXAMPLE 1

This example illustrates that mercury-contaminated sand that would be classified as a hazardous waste in accordance with accepted U.S. EPA standards can be treated by the method of the present invention to reduce the mercury content of the treated sand to a level at which the treated sand would be classified as a non-hazardous waste and to recover the mercury removed from said mercury-contaminated sand in reusable form.

A sample of mercury-contaminated sand weighing 150.0 grams was prepared by thoroughly mixing 3.7 grams of metallic mercury and 2.1 grams of mercury oxide (HgO) with 142.2 grams of silica sand to yield a contaminated material containing 37,500 parts per million (ppm) of mercury. The contaminated material was placed in a 5" long steel crucible having a 2" diameter semi-circular cross-section such that the maximum depth of the contaminated sample in the crucible was approximately one inch. The crucible containing the contaminated sample was then placed in an enclosed 2.5" diameter tubular steel heating chamber that was capable of being radiantly heated by an external heating source. The enclosed tubular steel heating chamber contained an inlet pipe and an outlet pipe designed such that air could be caused to flow into and out of said tubular chamber at a controllable flow rate. The aforesaid crucible and contaminated material were heated to, and maintained at, a temperature of 538° C. (1,000° F.) for a period of 3.5 hours in order to vaporize the mercury contained in the contaminated material sample. During this time, a controlled flow of air was maintained through the heating chamber at a rate of two liters per minute. All mercury vapor emanating from the heated contaminated material was carried from said heating chamber by the flow of air and transported to an 8" long×1" diameter tubular steel condenser that was cooled to and maintained at a temperature of approximately 16° C. (60° F.) by a continuous flow of water over the outer surface thereof in order to condense said mercury vapor to form metallic mercury. Upon exiting the condenser, the air flow, from which essentially all of the recoverable mercury had been removed, was passed through an 8-inch long×2½-inch diameter filter containing Calgon Grade HGR activated carbon in order to remove any residual mercury vapor and other gaseous and particulate contaminants from said air flow. Upon exiting the activated carbon filter, the air flow was passed through a Mersorb indicating-type chemical cartridge filter produce by Mine Safety Appliances, Inc. in order to remove any mercury vapor that still may be present in said air flow before exhausting the air flow to the atmosphere. The Mersorb filter is designed to change color when mercury is deposited therein and was used to indicate if any significant quantities of mercury passed through the condenser and activated carbon filters. After heating the mercury-contaminated sample for 3.5 hours, as described hereinbefore, the radiant heat source used to heat the tubular steel heating chamber was turned off and the sample was allowed to cool to room temperature over a period of approximately 6 hours while still in the heating chamber. During this cooling period, the flow of air through the enclosed tubular heating chamber was maintained at 2 liters per minute. With the sample and apparatus at room temperature, the treated sand sample was removed from the tubular heating chamber, weighed, and analyzed to determine the residual mercury content in the treated sand by means of atomic absorption analysis; the metallic mercury collected in the condenser was removed and weighed; and the Mersorb indicating filter was inspected to determine if any residual mercury passed through the condenser and activated charcoal filter.

As seen in Table 1, the results of this analysis show that the above described method of treating mercury-contaminated sand reduced the mercury content of the sample from 5.6 grams to 0.0003 gram for a total reduction of 99.99%, essentially all of the removed mercury was recovered in the condenser. The material was determined to be non-hazardous in the EPA TCLP test which showed a level of less than 0.1 milligrams per liter leachable mercury as compared to the upper limit of 0.2 milligrams per liter leachable mercury at which a waste material is classified as hazardous. Inspection of the Mersorb indicating filter showed no signs of mercury passing through the condenser and activated charcoal filter.

TABLE 1

| | UNTREATED SAMPLE | TREATED SAMPLE |
|---|---|---|
| Total Sample Weight: | 150.0 grams | 143.4 grams |

TABLE 1-continued

| | UNTREATED SAMPLE | TREATED SAMPLE |
|---|---|---|
| Contained Mercury: | 5.6 grams | 0.0003 grams |
| Weight of Mercury in Condenser: | 5.6 grams | — |
| Percent Mercury Weight Reduction: | — | 99.99% |
| TCLP (Leachable Mercury): | — | <0.1 ppm |

EXAMPLE 2

This example illustrates that the method of this invention can be utilized to convert a mercury-contaminated soil classified as hazardous waste in accordance with accepted EPA standards into a non-hazardous waste by removing the contained mercury therefrom.

A sample of mercury-contaminated soil weighing 119.9 grams and containing 0.2 grams of mercury was subjected to a three-stage heating/cooling cycle consisting of a drying stage, a vaporization stage, and a cooling stage utilizing the apparatus and techniques heretofore described in Example 1. The sample was first dried for a period of two hours at approximately 204° C. (400° F.) then subjected to a vaporization treatment for a period of 2.5 hours at a temperature of approximately 538° C. (1,000° F.). The vaporization treatment was followed by a cooling period of approximately 6 hours during which the treated sample returned to room temperature. During the drying period, an air flow of 5 liters per minute was maintained in the apparatus. During the vaporization and cooling periods, the air flow was maintained at a rate of 2 liters per minute. After cooling, the treated soil was removed from the apparatus and analyzed for mercury content as heretofore described in Example 1.

As shown in Table 2, the results of the analyses performed on the treated and untreated soil indicated that the mercury content of the soil was reduced from 0.2 gram to 0.00005 gram for a total reduction of 99.98% and the treated soil was determined to be non-hazardous in the EPA TCLP test with the total leachability of the contained mercury measured as less than 0.1 mg per liter. Inspection of the Mersorb indicating filter showed no signs of mercury passing through the activated carbon filter.

TABLE 2

| | UNTREATED SAMPLE | TREATED SAMPLE |
|---|---|---|
| Total Sample Weight: | 119.9 grams | 100.3 grams |
| Contained Mercury: | 0.2 grams | 0.00005 grams |
| Percent Mercury Weight Reduction: | — | 99.98% |
| TCLP (Leachable Mercury): | — | <0.1 ppm |

EXAMPLE 3

This example illustrates that incorporating calcium-containing additives into a mercury-contaminated material containing sulfur or mercury chloride compounds results in (a) retention of a significant portion of the contained sulfur in the treated material thereby dramatically reducing the volume of gaseous sulfur-bearing materials in the gaseous process effluent and (b) decomposition of a significant portion of the contained mercury chloride compounds during the vaporization process thereby lowering the temperature at which the mercury portion of said contaminated material is vaporized and improving the efficiency and effectiveness of the mercury removal/recovery process.

In order to demonstrate the effectiveness of a calcium oxide additive in retaining the sulfur contained in a sulfur-bearing mercury-contaminated sand and in assisting in the decomposition of any mercury chloride compounds contained in a mercury-contaminated sand, three different samples were prepared and subjected to similar thermal treatments to remove mercury from said mercury contaminated samples.

The first sample, the control sample which did not contain a calcium oxide additive, was prepared by intimately mixing 2.7 grams of mercury sulfide (HgS) and 5.6 grams of mercury chloride ($HgCl_2$) with 95.1 grams of silica sand to yield 103.3 grams of mercury-contaminated sand containing 6.4 grams of mercury (approximately 6.2% by weight), 0.4 grams of sulfur (approximately 0.4% by weight), and 1.4 grams of chlorine (approximately 1.4% by weight). This control sample was heated for approximately four hours at a temperature of 538° C. (1,000° F.) and then allowed to cool to room temperature for a period of approximately 6 hours utilizing the apparatus and techniques heretofore described in Example 1. Throughout the heating and cooling periods, an air flow of 2.5 liters per minute was maintained in the apparatus. After removal of the treated sample from the apparatus, the treated sample was weighed and the amounts of contained mercury, sulfur, and chlorine were determined by means of atomic absorption analyses.

As shown in Table 3, the results of these analyses indicated that the mercury content of the treated sample was reduced from 6.4 grams to 0.00005 gram for a total reduction of 99.999% and that none of the sulfur and none of the chlorine contained in the untreated sample were retained in the treated sample. Examination of the Mersorb indicating filter showed that no significant quantity of mercury passed through the activated carbon filters.

TABLE 3

| | UNTREATED SAMPLE | TREATED SAMPLE |
|---|---|---|
| Total Sample Weight: | 103.3 grams | 95.7 grams |
| Calculated Mercury: | 6.4 grams | — |
| Contained Mercury (By Analysis): | — | 0.00005 gram |
| Calculated Sulfur: | 0.4 gram | — |
| Contained Sulfur (By Analysis): | — | 0.0 gram |
| Calculated Chlorine | 1.4 grams | — |
| Contained Chlorine (By Analysis): | — | 0.0 gram |
| Percent Mercury Weight Reduction: | — | 99.99% |
| Percent Retained Sulfur: | — | 0.0% |
| Percent Retained Chlorine: | — | 0.0% |

In order to establish that incorporating a calcium oxide additive into a mercury-contaminated sand containing sulfur results in retention of a significant portion of said contained sulfur in the treated sand, a 120.0-gram sample of mercury-contaminated sand containing sulfur was prepared by thoroughly mixing 5.0 grams of mercury sulfide (containing 4.3 grams of mercury and 0.7 gram of sulfur) and 12.0 grams of calcium oxide with 103.0 grams of silica sand. This second sample was heated for approximately five hours at a temperature of 538° C. (1,000° F.) and then allowed to cool to room temperature for a period of approximately 6 hours utilizing the apparatus and techniques heretofore described in Example 1. Throughout the heating and cooling periods, an air flow of 3 liters per minute was maintained in the apparatus. After removal of the treated sample from the apparatus, said treated sample was weighed and the amounts of contained mercury and sulfur were determined by means of atomic absorption analyses.

As shown in Table 4, the results of the aforesaid analyses showed that the mercury content of the treated sample was reduced from 4.3 grams to 0.0025 gram for a total reduction of 99.94% and that essentially 100% of the sulfur contained in the untreated sample was retained in the treated sample thereby significantly reducing the gaseous sulfur-bearing contaminants in the process air effluent. Examination of the Mersorb indicating filter showed that no significant quantity of mercury passed through the activated carbon filters.

TABLE 4

|  | UNTREATED SAMPLE | TREATED SAMPLE |
| --- | --- | --- |
| Total Sample Weight: | 120.0 grams | 117.0 grams |
| Calculated Mercury: | 4.3 grams | — |
| Contained Mercury (By Analysis): | — | 0.0025 gram |
| Percent Mercury Weight Reduction: | — | 99.94% |
| Calculated Sulfur: | 0.7 gram | — |
| Contained Sulfur (By Analysis): | — | 0.8 gram |
| Percent Retained Sulfur: | — | Essentially 100% |

In order to illustrate that incorporating a calcium oxide additive into a mercury-contaminated material containing a mercury chloride compound results in decomposition of a significant portion of said compound during the vaporization process, a 120.0-gram sample of mercury-contaminated sand containing mercury chloride was prepared by thoroughly mixing 5.0 grams of mercury chloride (containing 3.7 grams of mercury and 1.3 grams of chlorine) and 12.0 grams of calcium oxide with 103.0 grams of silica sand. This third sample was heated for approximately five hours at a temperature of 538° C. (1,000° F.) and then allowed to cool to room temperature for a period of approximately 6 hours utilizing the apparatus and techniques heretofore described in Example 1. Throughout the heating and cooling periods, an air flow of 3 liters per minute was maintained in the apparatus. After removal of the treated sample from the apparatus, the treated sample was weighed and the amounts of contained mercury and chlorine were determined by means of atomic absorption analysis.

As shown in Table 5, the results of the aforesaid analyses showed that the mercury content of the treated sample was reduced from 3.7 grams to 0.0001 gram for a total reduction of 99.998% and that 51.4% of the chlorine contained in the untreated sample was retained in the treated sample thereby demonstrating that a significant portion of the mercury chloride contained in the untreated sample was decomposed prior to vaporization of the mercury portion from said untreated sample. Examination of the Mersorb indicating filter showed that no significant quantity of mercury passed through the activated carbon filters.

TABLE 5

|  | UNTREATED SAMPLE | TREATED SAMPLE |
| --- | --- | --- |
| Total Sample Weight: | 120.0 grams | 117.0 grams |
| Calculated Mercury: | 3.7 grams | — |
| Contained Mercury (By Analysis): | — | 0.0001 gram |
| Calculated Chlorine: | 1.3 grams | — |
| Contained Chlorine (By Analysis): | — | 0.67 gram |
| Percent Mercury Weight Reduction: | — | 99.998% |
| Percent Retained Chlorine: | — | 51.45% |

While for convenience the above discussion and illustrations have made reference to specific process configurations, process sequences, and chemical compositions and additives, it will be apparent to those skilled in the art that one may practice the invention without first comminuting the contaminated material or mixing said contaminated material with additives and that one may practice the invention employing other process configurations, process sequences, and chemical compositions.

It will be appreciated that the present invention, through its being suitable for securement on or in a vehicle, is adapted to process the contaminated material at the location of the same, thereby enhancing the efficiency of operation of the system.

Whereas particular embodiments of the invention have been described herein for purposes of illustration, it will be evident to those skilled in the art that numerous variations of the details may be made without departing from the invention as set forth in the appended claims.

We claim:

1. A method of purifying contaminated material comprising heating said contaminated material to a first temperature to vaporize moisture contained therein without substantially vaporizing the mercury portion thereof, discharging said vaporized moisture to the atmosphere without substantial condensation thereof, subsequently heating said contaminated material to a higher temperature to vaporize the mercury portion thereof, condensing said vaporized mercury portion to obtain at least one of elemental mercury and mercury compounds, and effecting said purification at essentially atmospheric pressure.

2. The method of claim 1 including employing said method to purify contaminated soil.

3. A method of purifying contaminated material comprising heating said contaminated material to a first temperature to vaporize moisture contained therein without substantially vaporizing the mercury portion thereof, subsequently heating said contaminated material to a higher temperature to vaporize the mercury portion thereof, condensing said vaporized mercury portion to obtain at least one of elemental mercury and mercury compounds, effecting said purification at essentially atmospheric pressure, and during said process effecting decomposition of mercury halides in said contaminated material.

4. A method of purifying contaminated material comprising
heating said contaminated material to a first temperature to vaporize moisture contained therein without substantially vaporizing the mercury portion thereof,
subsequently heating said contaminated material to a higher temperature to vaporize the mercury portion thereof,
condensing said vaporized mercury portion to obtain at least one of elemental mercury and mercury compounds,
effecting said purification at essentially atmospheric pressure,
employing said method to purify contaminated soil, and
during said process stabilizing sulfurous substances present in said contaminated material.

5. The method of claim 3 including
effecting said mercury halide decomposition by means of a calciferous material admixed with said contaminated material prior to heating thereof.

6. The method of claim 5 including
employing at least one calciferous material selected from the group consisting of calcium oxide, limestone, hydrated lime, and cement kiln dust.

7. The method of claim 4 including
effecting said sulfurous substance stabilization by means of a calciferous material admixed with said contaminated material prior to heating thereof.

8. The method of claim 7 including
employing at least one calciferous material selected from the group consisting of calcium oxide, limestone, hydrated lime, and cement kiln dust.

9. The method of claim 3 including effecting said mercury halide decomposition by means of at least one material selected from the group consisting of oxides of sodium, oxides of potassium and oxides of magnesium.

10. The method of claim 4 including
effecting said sulfurous substance stabilizing by means of at least one material selected from the group consisting of oxides of sodium, oxides of potassium, and oxides of magnesium.

11. A method of purifying contaminated material comprising
heating said contaminated material to a first temperature to vaporize moisture contained therein without substantially vaporizing the mercury portion thereof,
subsequently heating said contaminated material to a higher temperature to vaporize the mercury portion thereof,
condensing said vaporized mercury portion to obtain at least one of elemental mercury and mercury compounds,
effecting said purification at essentially atmospheric pressure,
employing said method to purify contaminated soil, and
effecting said purification on a vehicle.

12. The method of claim 11 including
effecting said purification at or in close proximity to the site of said contaminated soil, and
after effecting said purification moving said vehicle to another site and purifying contaminated soil at said other site.

13. The method of claim 1 including
effecting said purification at a subatmospheric pressure of about 0.95 to 0.995 atmospheres.

14. The method of claim 1 including
cooling and recovery the decontaminated material.

15. The method of claim 14 including
recovery the freed mercury.

16. The method of claim 2 including
cleaning the effluent from said condensing step before discharging the same to the atmosphere.

17. A method of purifying contaminated material comprising
heating said contaminated material to a first temperature to vaporize moisture contained therein without substantially vaporizing the mercury portion thereof,
subsequently heating said contaminated material to a higher temperature to vaporize the mercury portion thereof,
condensing said vaporized mercury portion to obtain at least one of elemental mercury and mercury compounds,
effecting said purification at essentially atmospheric pressure,
employing said method to purify contaminated soil,
cleaning the effluent from said condensing step before discharging the same to the atmosphere, and
effecting said heating steps in a batch furnace.

18. A method of purifying contaminated material comprising
heating said contaminated material to a first temperature to vaporize moisture contained therein without substantially vaporizing the mercury portion thereof,
subsequently heating said contaminated material to a higher temperature to vaporize the mercury portion thereof,
condensing said vaporized mercury portion to obtain at least one of elemental mercury and mercury compounds,
effecting said purification at essentially atmospheric pressure, and
performing said process in a containment chamber which is maintained at a negative pressure with respect to the atmosphere.

19. The method of claim 1 including
effecting the first heating step at a first temperature of about 16° C. to 260° C. for about ¼ to 4 hours.

20. The method of claim 19 including
effecting the second heating step at a second temperature of about 316° C. to 816° C. for about ¼ to 8 hours.

21. The method of claim 20 including
effecting said second heating step at a second temperature of about 538° C. to 593° C. for about 2 to 6 hours.

22. A method of purifying material comprising
heating said contaminated material to a first temperature to vaporize moisture contained therein without substantially vaporizing the mercury portion thereof,
subsequently heating said contaminated material to a higher temperature to vaporize the mercury portion thereof,
condensing said vaporized mercury portion to obtain at least one of elemental mercury and mercury compounds, effecting said purification at essentially atmospheric pressure, and employing a first condenser for condensing vapors from said first heating process and a second condenser for condensing vapors from said second heating process.

23. The method of claim 22 including vaporizing both moisture and hydrocarbon in said first heating step, condensing said hydrocarbons in said first condenser.

24. The method of claim 23 including passing said vaporized moisture through said first condenser without condensing the same.

25. Apparatus for purifying contaminated material comprising furnace means for heating said contaminated material to a first temperature for vaporizing moisture contained in said contaminated material without substantial vaporization of the mercury portion thereof, and subsequently heating said contaminated material to a second temperature higher than said first temperature to vaporize said mercury portion, means for discharging said vaporized moisture to the atmosphere without substantial condensation thereof, condenser means for receiving the vaporized mercury portion and condensing the same into at least one of elemental mercury and mercury compounds, and means for effecting said purification at essentially atmospheric pressure.

26. The apparatus of claim 25 including said apparatus being portable.

27. The apparatus of claim 26 including said apparatus being mounted on or in a vehicle.

28. The apparatus of claim 25 including said apparatus having means for effecting said purification at a subatmospheric pressure of about 0.95 to 0.995 atmosphere.

29. The apparatus of claim 25 including a containment chamber, and said furnace means and said condenser means being disposed within said containment chamber.

30. The apparatus of claim 27 including air cleaner means for receiving effluent gas from said condenser means and removing impurities therefrom prior to discharge of said effluent gas to the atmosphere.

31. The apparatus of claim 30 including said first temperature being 16° C. to 260° C.

32. The apparatus of claim 31 including said second temperature being about 316° C. to 816° C.

33. The apparatus of claim 27 including said condenser means having a first condenser for receiving material vaporized by said furnace at said first temperature and a second condenser for receiving material vaporized by said furnace at said second temperature.

34. The apparatus of claim 33 including said first condenser means having a temperature setting at which hydrocarbons vaporized at said first furnace temperature will condense, but moisture vaporized at said first furnace temperature will not.

35. The apparatus of claim 25 including blender means for blending said contaminated material with an additive for facilitating halide decomposition and sulfurous substance stabilizing, and said blender means being operatively associated with said furnace to supply said blended contaminated material and additive thereto.

36. The apparatus of claim 29 including first air moving means in communication with the interior of said containment chamber for applying a negative pressure thereto.

37. The apparatus of claim 28 including second air moving means in direct or indirect communication with said furnace to establish essentially atmospheric pressure therein.

38. The apparatus of claim 37 including said second air moving means having means for establishing said furnace pressure at a subatmospheric pressure of about 0.95 to 0.995 atmospheres.

39. The apparatus of claim 27 including said vehicle being a truck trailer.

40. The method of claim 1 including employing said method in treating contaminated materials containing a volatile hydrocarbon component, effecting vaporization of said moisture and said volatile hydrocarbon at said first temperature, prior to vaporizing said mercury portion condensing said hydrocarbons but not said vaporized moisture employing first condenser means, and effecting said condensation of said vaporized mercury portion in second condenser means.

* * * * *

UNITED STATES PATENT AND TRADEMARK OFFICE
CERTIFICATE OF CORRECTION

PATENT NO. : 5,300,137
DATED : April 5, 1994
INVENTOR(S) : THOMAS E. WEYAND ET AL.

It is certified that error appears in the above-indentified patent and that said Letters Patent is hereby corrected as shown below:

On the title page:
In the Abstract, line 5, "individual" should be --initial--.

Column 1, line 68, "decontaminations" should be --decontamination--.

Column 2, line 3, "very" should be --vary--.

Signed and Sealed this

Sixth Day of December, 1994

Attest:

BRUCE LEHMAN

*Attesting Officer*           *Commissioner of Patents and Trademarks*